United States Patent
Kaladgi et al.

(10) Patent No.: US 10,417,449 B2
(45) Date of Patent: *Sep. 17, 2019

(54) PROTECTION OF CONFIDENTIAL DATA BEING DISPLAYED OR INPUT IN A MOBILE DEVICE

(71) Applicant: CA, Inc., New York, NY (US)

(72) Inventors: Mohammed Mujeeb Kaladgi, Bangalore (IN); Jameel Ahmed Kaladgi, Bangalore (IN); Ruqiya Nikhat Kaladgi, Bangalore (IN); Yashwant Ramkishan Sawant, Parbhani (IN)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,661

(22) Filed: Jan. 10, 2018

(65) Prior Publication Data

US 2018/0129824 A1    May 10, 2018

Related U.S. Application Data

(62) Division of application No. 15/003,438, filed on Jan. 21, 2016, now Pat. No. 9,904,799.

(51) Int. Cl.
| | |
|---|---|
| *G06F 7/04* | (2006.01) |
| *G06F 21/62* | (2013.01) |
| *G09G 5/10* | (2006.01) |
| *G06F 3/03* | (2006.01) |
| *G06F 17/24* | (2006.01) |
| *G06F 21/84* | (2013.01) |
| *G06F 3/14* | (2006.01) |

(52) U.S. Cl.
CPC ........ *G06F 21/6245* (2013.01); *G06F 3/0304* (2013.01); *G06F 17/24* (2013.01); *G06F 21/84* (2013.01); *G09G 5/10* (2013.01); *G06F 3/14* (2013.01); *G09G 2320/062* (2013.01); *G09G 2358/00* (2013.01)

(58) Field of Classification Search
CPC ............................ G06F 21/6245; G06F 21/84
USPC .................................................. 726/26–27
See application file for complete search history.

(56) References Cited

U.S. PATENT DOCUMENTS

| | | | | |
|---|---|---|---|---|
| 5,231,381 | A * | 7/1993 | Duwaer | G06F 3/016 178/18.03 |
| 6,742,901 | B2 * | 6/2004 | Kimura | H04N 5/74 348/E5.137 |
| 6,771,349 | B2 * | 8/2004 | Sitrick | G03B 21/26 348/164 |

(Continued)

FOREIGN PATENT DOCUMENTS

| | | |
|---|---|---|
| EP | 1345428 A2 | 9/2003 |
| WO | 2005125193 A1 | 12/2005 |

*Primary Examiner* — Samson B Lemma
(74) *Attorney, Agent, or Firm* — Gilliam IP PLLC

(57) ABSTRACT

To protect confidential data, a mobile device determines whether the mobile device is at a location susceptible to visual capture of confidential data entered into the phone by external cameras. The mobile device determines whether focus of a display is on a field in which confidential data is entered. If the mobile device determines that it is at a location susceptible to an external imaging device visually capturing confidential data input into the input field, then the mobile device activate a light source on a same side as the screen presenting the display.

20 Claims, 8 Drawing Sheets

(56) References Cited

U.S. PATENT DOCUMENTS

| | | | |
|---|---|---|---|
| 6,861,640 B2* | 3/2005 | Light | H04N 5/913 250/208.2 |
| 8,157,396 B2* | 4/2012 | Smith, Jr. | G03B 15/02 362/3 |
| 2004/0094697 A1* | 5/2004 | Light | H04N 5/913 250/221 |
| 2009/0295760 A1* | 12/2009 | Linge | G06F 3/0412 345/179 |
| 2015/0049487 A1* | 2/2015 | Connor | F21V 33/0076 362/277 |

* cited by examiner

PROTECTION OF CONFIDENTIAL DATA BEING DISPLAYED OR INPUT IN A MOBILE DEVICE

BACKGROUND

The disclosure generally relates to the field of data protection, and more particularly to protection of confidential data being displayed or input in a mobile device.

Many users are now using their mobile devices for a variety of applications. In addition to being used for telephone calls, texts, and emails, users are now using their mobile devices for banking, online purchasing, etc. A number of these applications require the user to enter confidential data, such as passwords, pins, etc. prior to their use. Additionally, a number of these applications display confidential data (e.g., account numbers, social security numbers, dates of birth, etc.) during their execution. There is an increasing concern that this confidential data can be captured by various image capture devices, especially in public places. For example, a number of public places (e.g., such as malls, restaurants, government buildings, public streets, etc.) now include security cameras to monitor for criminal activity. These security cameras continue to evolve to capture higher resolution video and images. Unfortunately, these security cameras can also be used for nefarious purposes. Specifically, these security cameras can be used to capture video and images of the confidential data being displayed or input on users' mobile devices.

BRIEF DESCRIPTION OF THE DRAWINGS

Embodiments of the disclosure may be better understood by referencing the accompanying drawings.

DESCRIPTION

Figure 1:
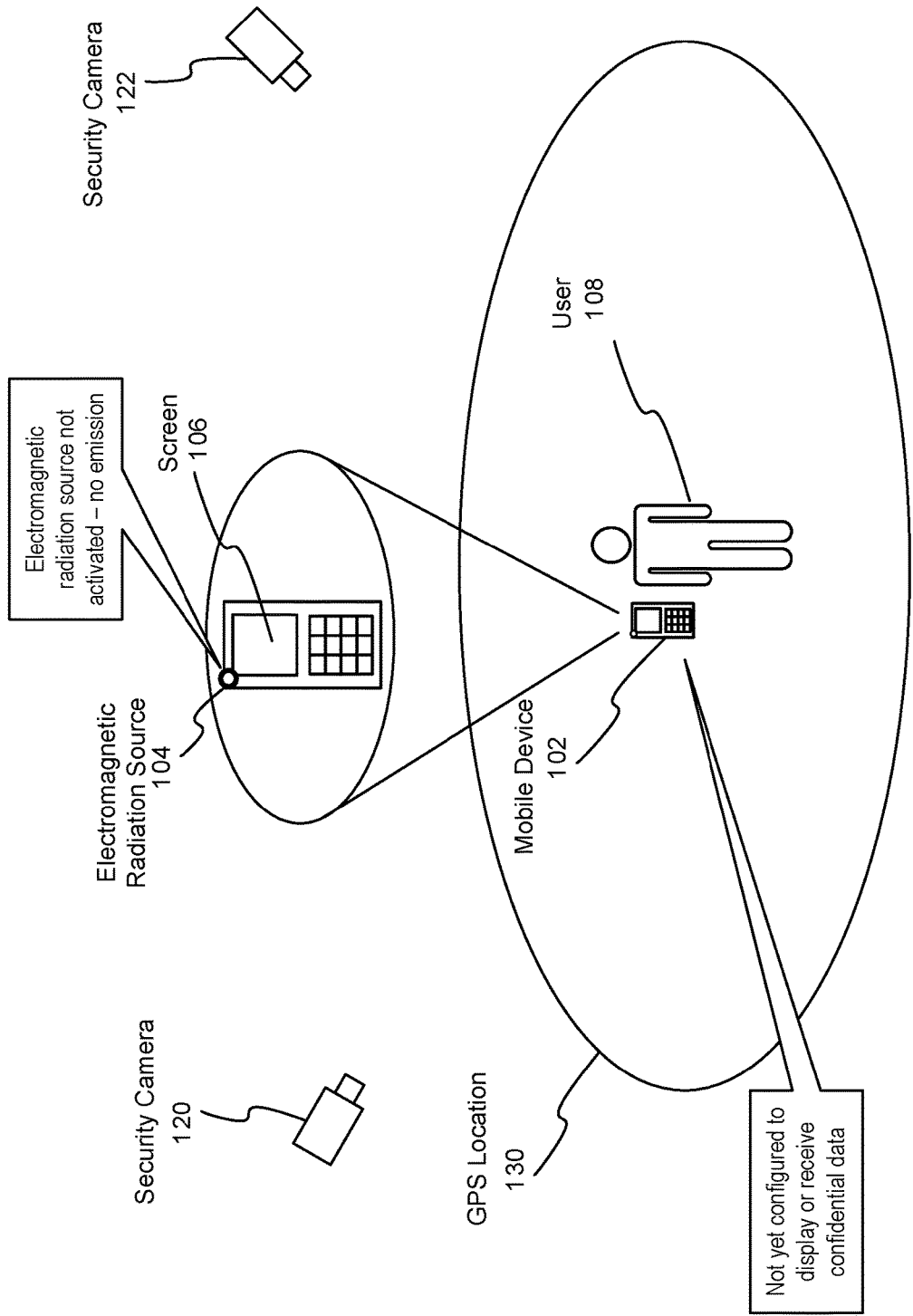
FIGS. 1-3 depict an example application environment for protection of confidential data being input by a user into their mobile device over time, according to some embodiments.

The description that follows includes example systems, methods, techniques, and program flows that embody embodiments of the disclosure. However, it is understood that this disclosure may be practiced without these specific details. For instance, this disclosure refers to protection of input of confidential data into a mobile device using an electromagnetic (e.g., light) source. But aspects of this disclosure can be used for protection of confidential data into other devices (e.g., notebook computers, tablet devices, Automatic Transaction Machines (ATM), etc.). In other instances, well-known instruction instances, protocols, structures and techniques have not been shown in detail in order not to obfuscate the description.

Overview

Some embodiments provide protection of confidential data that is displayed or input by a user into their mobile device. Protection of the confidential data can include activation of an electromagnetic radiation source that is part of the mobile device to emit electromagnetic radiation (such as visible light) while confidential data is being input. For example, a front facing LED light source on the mobile device can be activated while confidential data is being displayed or input to the mobile device. Activation of the electromagnetic radiation source can cause emission of electromagnetic radiation, which in turn can obscure the confidential data being displayed or input on a screen of the mobile device. After completion of display or input of the confidential data, the electromagnetic radiation source can be deactivated. In some embodiments, the activation of the electromagnetic radiation source to provide confidential data protection occurs when the mobile device is in a public place that can include security cameras. Accordingly, the electromagnetic radiation can preclude the security cameras from capturing the confidential data.

Confidential data can be any type of data that intended to be kept private, restricted, secret, etc. Confidential data include passwords, pin numbers, account numbers, user names, social security number, dates of birth, etc. Public places can include any area that includes security cameras used to monitor activity therein. For example, public places can be as broadly defined to include any location outside a user's residence that can include the use of security cameras. Examples of public places can include malls, businesses, government buildings, convenience stores, college campuses, public streets, etc.

In some embodiments, a location of the mobile device can be determined using Global Positioning System (GPS) based technology. The mobile device's location can be determined to be public based on its GPS location. For example, various mobile applications provide mapping that identify locations using the GPS location of the mobile device. These mobile applications can provide identifying data for locations to define the locations as public.

If the location of the mobile device is public, some embodiments monitor to determine when the mobile device is configured to receive or display confidential data. An example can be a main login screen displayed on a mobile device's screen to allow the user to input a pin number to access to the mobile device generally. Another example can be a mobile application for a bank executing on the mobile device to present a Graphical User Interface (GUI) to receive a password of the user. In some embodiments, the mobile device is configured to receive confidential data if any type of interface is displayed on a screen of the mobile device to receive confidential data from the user. In some other embodiments, the mobile device is configured to receive confidential data if a screen focus of the mobile device includes an input field (e.g., a dialog box) where the user is to input their confidential data. Some embodiments can also be triggered in response to display of any type of confidential data on the screen of the mobile device. For example, some mobile applications can display a user's birthday, a user's social security number or any other type of private information about the user.

If the location of the mobile device is public and the mobile device is configured to receive confidential data from a user or display confidential data on the screen of the mobile device, etc., an electromagnetic radiation source of the mobile device can be activated during the period when confidential data can be received or displayed. An example of an electromagnetic radiation source can include a visible light source, such as a Light Emitting Diode (LED) light source. In some embodiments, the electromagnetic radiation source is front facing. In other words, the electromagnetic radiation source is facing out a same general direction from the mobile device as the screen of the mobile device. A front facing electromagnetic radiation source can include sources that are positioned outward but at varying angles relative to the screen (as long as the electromagnetic radiation emission results in a display on the screen being obscured for image or video capture by security cameras). The electromagnetic radiation source can be a source that is in addition to any source of light used for the actual display on the screen of the mobile device.

Example Application Environment

Figure 2:
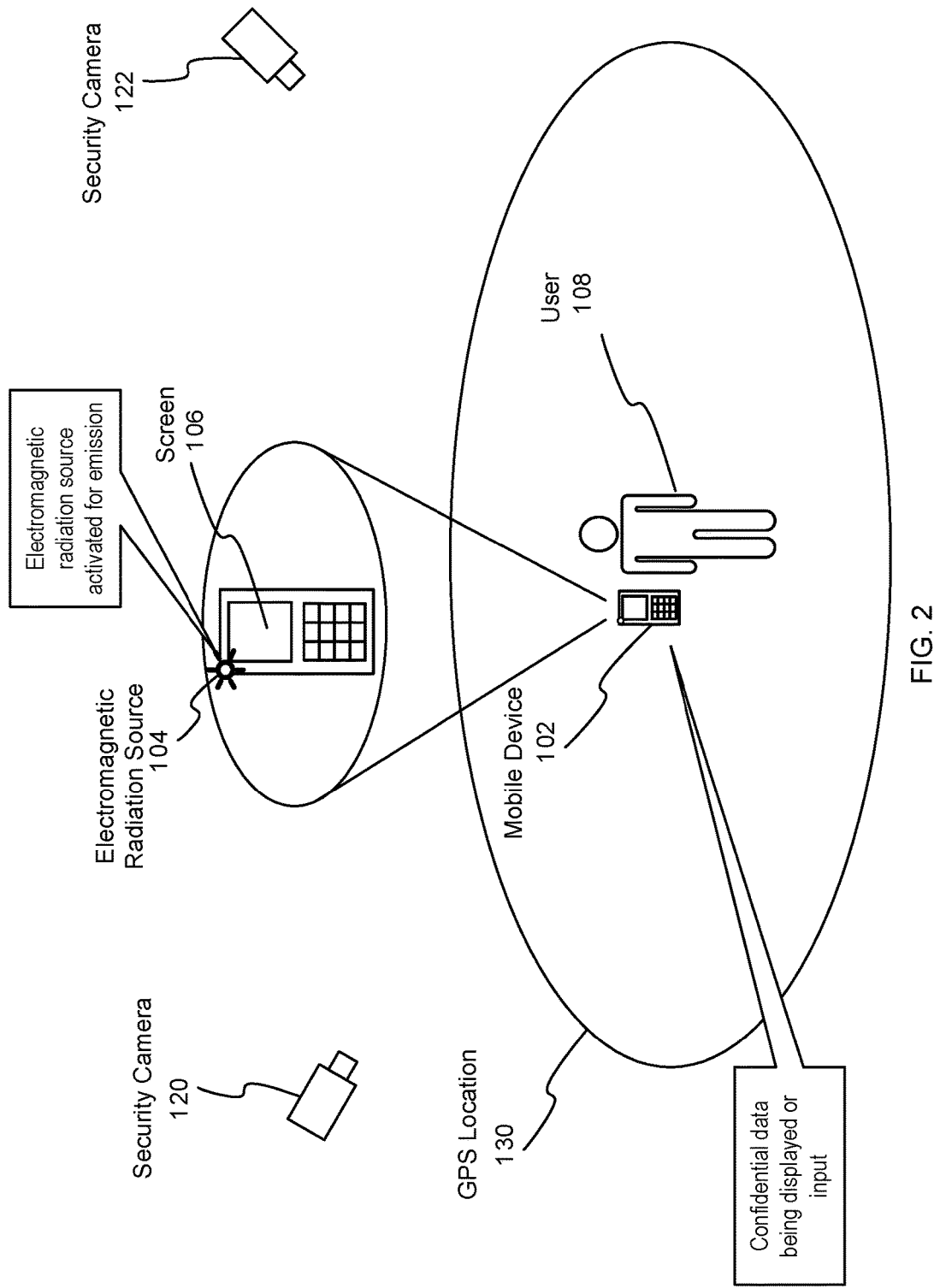
Figure 3:
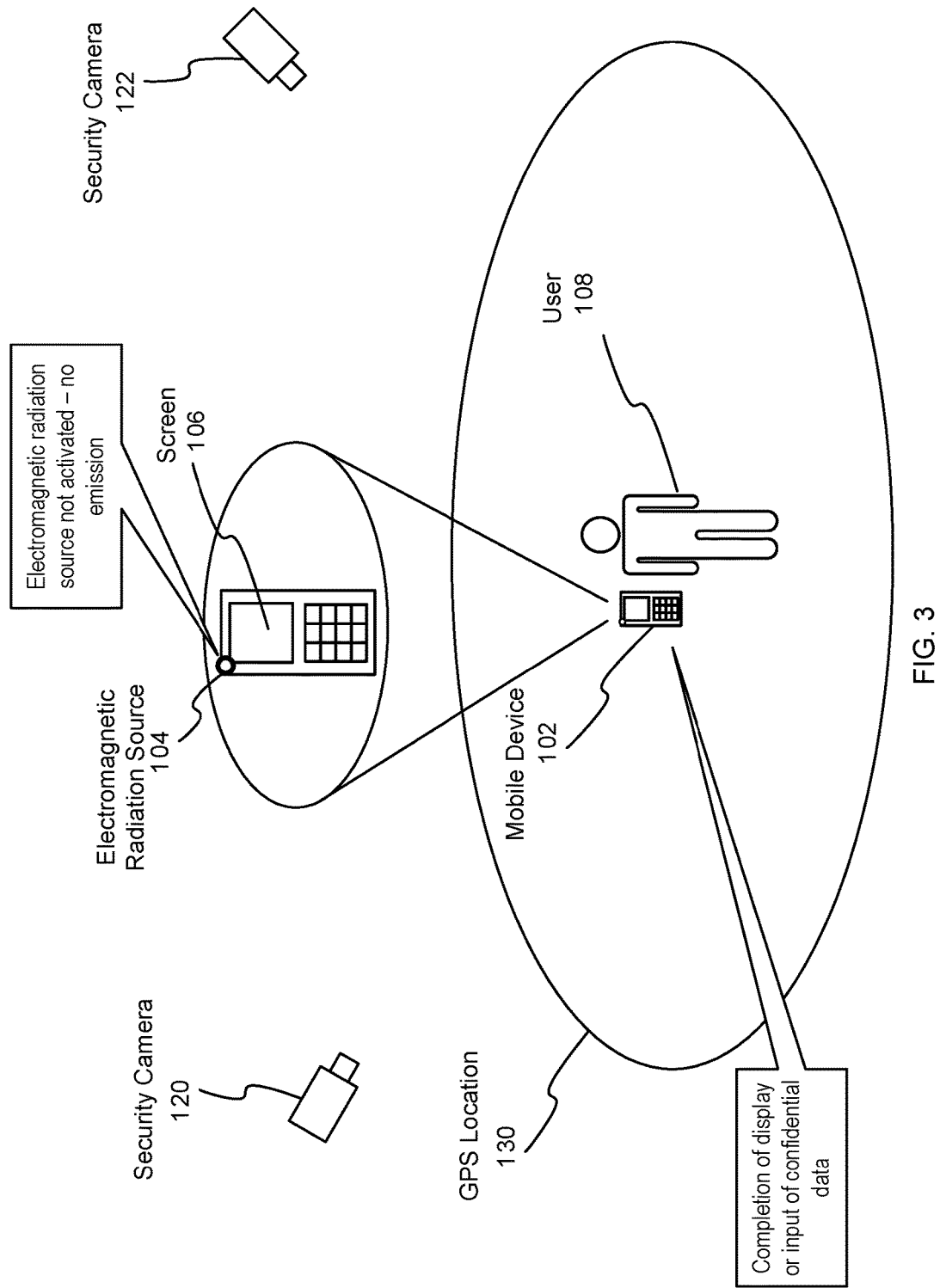

FIGS. 1-3 depict an example application environment for protection of confidential data being input by a user into their mobile device over time, according to some embodiments. FIGS. 1-3 depict a user 108 having a mobile device 102 at a GPS location 130. In this example, the GPS location 130 is considered to be in a public place. FIGS. 1-3 also depict security cameras 120-122 that are capturing video or images of the public place. While depicted as security cameras, some embodiments are applicable to any type of imaging device to capture video or images of the public place.

The mobile device 102 includes an electromagnetic radiation source 104 and a screen 106. The electromagnetic radiation source 104 can be a visible light source (e.g., LED light). In this example, the electromagnetic radiation source 104 can be front facing (facing a same direction as the screen 106). When the electromagnetic radiation source 104 is activated, the electromagnetic radiation source can obscure what is being displayed on the screen 106. In some embodiments, emission of the electromagnetic radiation can be essentially constant. Alternatively, emission of the electromagnetic radiation can be a blinking emission (wherein the electromagnetic radiation source is switched on and off quickly and repeatedly).

Figure 5:
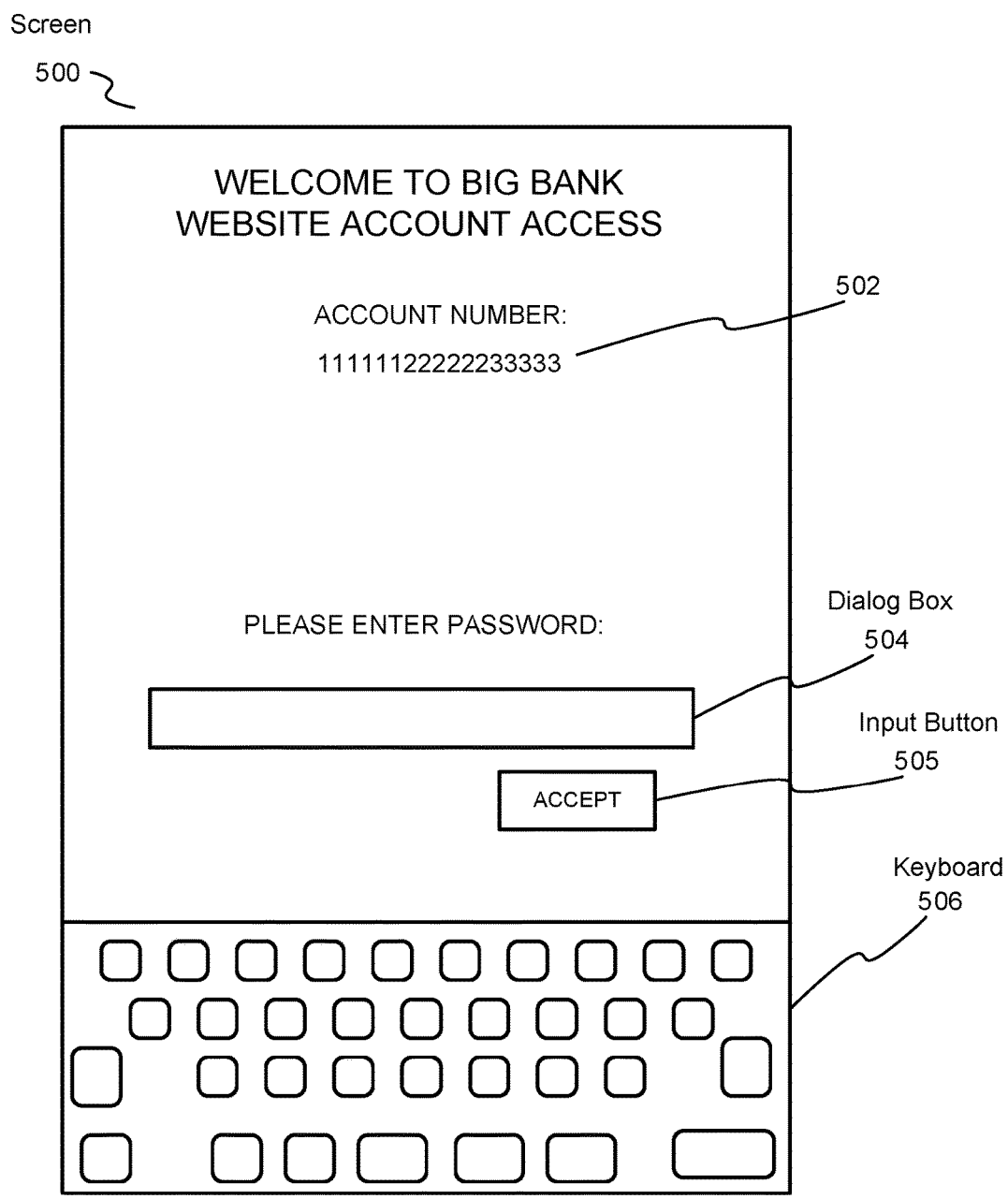
FIG. 5 depicts an example display of an interface on a screen of a mobile device, according to some embodiments.

In some embodiments, the electromagnetic radiation source 104 is activated to emit electromagnetic radiation in response to the mobile device 102 being in a public place and in response to the screen 106 displaying confidential data or configured to receive input from the user 108 that includes confidential data. After the confidential data is no longer displayed or the input of confidential data is completed, the electromagnetic radiation source 104 is deactivated to cease emission of electromagnetic radiation. In some embodiments, the mobile device 102 is configured to receive confidential data if any type of interface is displayed on the screen 106 of the mobile device 102 to receive confidential data from the user. In some other embodiments, the mobile device 102 is configured to receive confidential data if a screen focus of the mobile device 102 includes an input filed (e.g., a dialog box) where the user is to input their confidential data. FIG. 5 (further described below) helps illustrate these variations of displaying and receiving confidential data on the mobile device 102.

The mobile device 102 can include a GPS module (as further described below) to determine its GPS location. The mobile device 102 can also include a mobile application that provides maps that identify various locations on the earth (a mapping mobile application) using the GPS module. The locations can include businesses, malls, airports, government buildings, streets, public parks, schools, private residences, and other points of interest. In some embodiments, different locations identified by the mapping can be defined as a public place. The mapping mobile application can provide these identifications of being a public place. For example, a location that includes a business, airport, mall, school, public park, downtowns of cities of at least a minimum population, certain public streets defined as busy, etc. can be defined as a public place. The user can also personalize the identification of public places for their mobile device. For example, the user can change a location from being identified as a public place to not being a public place, or vice versa. To illustrate, the user can configure their mobile device to define a location as their residence and that any location that does not include their residence is considered a public place.

In some embodiments, there can be varying security levels for confidential data for a mobile device. For example, if the confidential data to be displayed or input at the mobile device is a user's social security number, a security level for this confidential data can be considered high. In contrast, if the confidential data to be displayed or input is a password to a kid's application, a security level for this confidential data can be considered low. The security levels of the confidential data can also vary whether a location is a public place or not. For example, if the confidential data's security level is high, any location external to the user's residence can be defined as a public place. In contrast, if the confidential data's security level is low, only businesses and government buildings are defined as a public place.

FIG. 1 depicts the example application environment in a first point in time when the user 108 with their mobile device 102 enters the public place defined by the GPS location 130. For FIG. 1, the screen 106 of the mobile device 108 is not yet displaying or configured to receive confidential data from the user 108. For example, the mobile device 108 could be turned off, in sleep mode, displaying a main screen of clickable applications, executing an application that is not current displaying or requesting input of confidential data, etc. Even though a location of the mobile device 102 is defined to be public, the electromagnetic radiation source 104 is not activated because confidential data is not being displayed or input on the screen 106.

FIG. 2 depicts the example application environment in a second point in time when the mobile device 102 is in the public place defined by the GPS location 130 and when confidential data is being displayed or input on the screen 106. For example, a user's account number could be displayed as part of the display on the screen 106 while a banking mobile application is executing on the mobile device 102. Alternatively, or in addition, the same banking mobile application could be displaying a dialog box (which is currently part of the screen focus) for the user to input their password. In this example, the electromagnetic radiation source 104 is activated to cause emission of electromagnetic radiation (e.g., visible light) to obscure the display on the screen 106. As a result, the security cameras 120-122 are precluded from capturing images or video of the display on the screen 106. As described above, emission of the electromagnetic radiation can be essentially a constant emission or a blinking emission.

FIG. 3 depicts the example application environment in a third point in time when the mobile device 102 is still in the public place defined by the GPS location 130 but subsequent to confidential data is being displayed or input on the screen 106. For example, the display on the screen 106 is no longer displaying confidential data. In another example, the third point in time can be after the user has selected an input button to accept the confidential data being input. Like in FIG. 1, even though a location of the mobile device 102 is defined to be public, the electromagnetic radiation source 104 is not activated because confidential data is not being displayed or input on the screen 106.

Example Mobile Device

Figure 4:
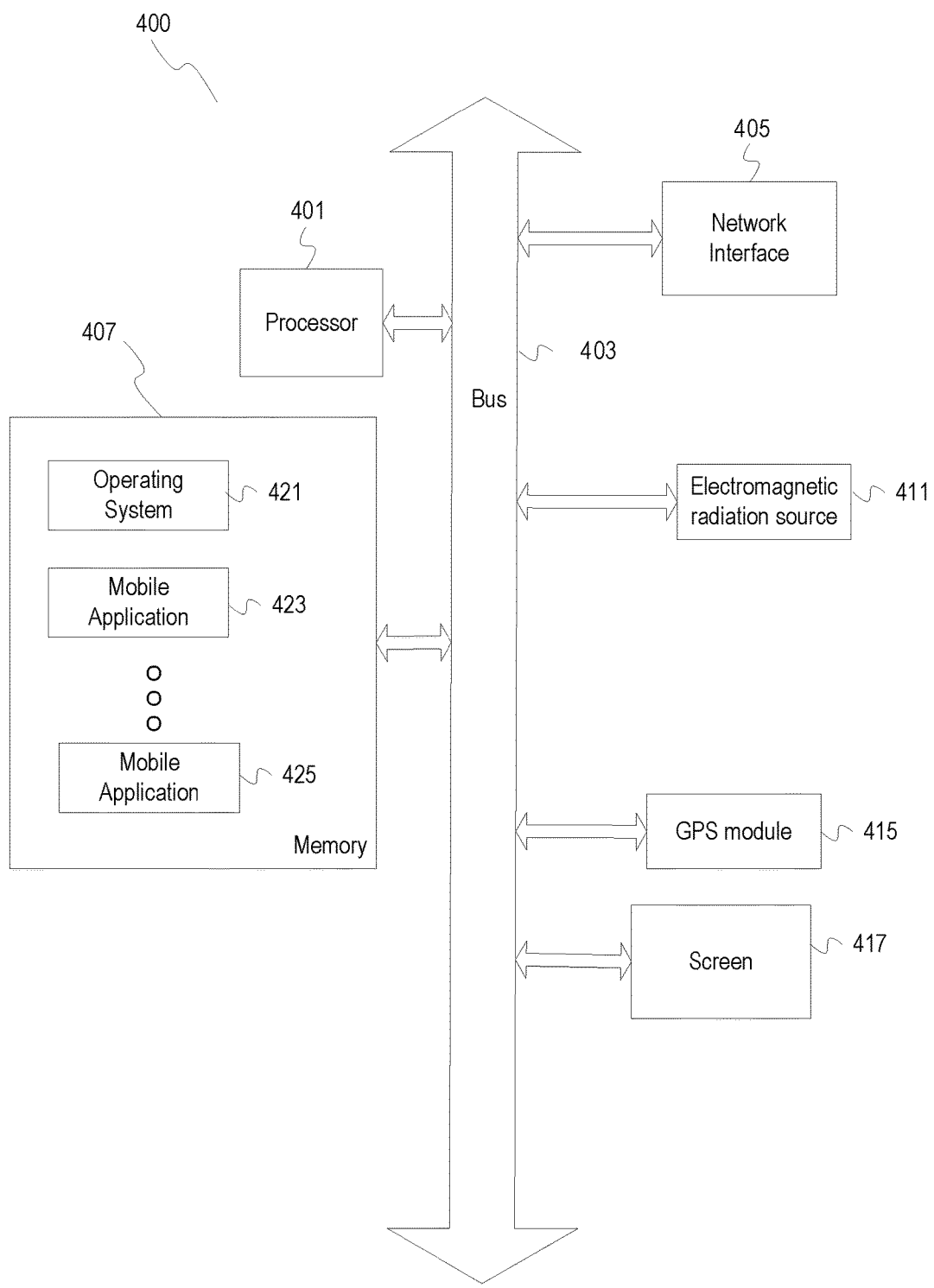
FIG. 4 depicts an example mobile device, according to some embodiments.

FIG. 4 depicts an example mobile device, according to some embodiments. A mobile device 400 depicted in FIG. 4 can represent the mobile device 102 depicted in FIGS. 1-3. The mobile device 400 includes a processor 401 (possibly including multiple processors, multiple cores, multiple nodes, and/or implementing multi-threading, etc.). The mobile device 400 includes a memory 407. The memory 407 can represent a volatile memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The memory 407 can also represent a nonvolatile memory (e.g., flash memory) for a persistent storage of data.

In this example, the memory 407 is configured to store an operating system 421 and a number of mobile applications (mobile applications 423-425). The operating system 421 includes the software to manage the computer resources (hardware and software) of the mobile device 401. The operating system 421 can also provide common services for the mobile applications 423-425. The mobile applications 423-425 can represent any type of applications (pre-installed, downloaded) to provide a service on the mobile device. At least some of the mobile applications 423-425 can display confidential data and/or allow for input of confidential data from a user of the mobile device 400 (as described above). The operating system 421 or any of the mobile applications 423-425 can perform the protection of confidential data, as described above. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Although not shown, the mobile device can include other types of storage. For example, the mobile device 400 can include a persistent data storage such as a hard disk drive (e.g., magnetic storage device).

The mobile device 400 also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The mobile device 400 includes an electromagnetic radiation source 411. The electromagnetic radiation source 411 can be any type of component that can emit electromagnetic radiation. For example, the electromagnetic radiation source 411 can be a light source to emit visible light. The electromagnetic radiation source 411 can represent the electromagnetic radiation source 104 depicted in FIGS. 1-3.

The mobile device 400 includes a GPS module 415. The GPS module 415 can be hardware, software, firmware, or a combination thereof to provide location and time. The GPS module 415 can receive signals from a number of satellites orbiting around the Earth. The signals include data that indicates the satellite position and current time. Based on the satellite position and time when signals were sent from multiple satellites, the GPS module 415 can use trilateration to determine its location on the Earth. In some example embodiments, differential GPS is used, wherein the area has already been surveyed using a GPS. The mobile device 400 also includes a screen 417 (e.g., Liquid Crystal Display (LCD) screen). The screen 417 can display various displays, graphics, etc. (including confidential data, as described above).

The processor 401, the memory 407, the network interface 405, the electromagnetic radiation source 411, the GPS module 415, and the screen 417 are coupled to the bus 403. Although illustrated as being coupled to the bus 403, the memory 407 may be coupled to the processor 401.

FIG. 5 depicts an example display of an interface on a screen of a mobile device, according to some embodiments. A screen 500 depicted in FIG. 5 can represent the screen 106 of the mobile device 102 depicted in FIGS. 1-3. The screen 500 includes a display of a Graphical User Interface (GUI) that can be displayed by a banking mobile application executing on the mobile device. The display includes a display of a user's banking account number 502. The display also includes a display of a dialog box 504, wherein a user's password can be entered using a keyboard 506 when a screen focus of the screen 500 includes the dialog box 504. A screen focus of the screen 500 is that part of the screen that is active to receive input from a user of the mobile device. For example, the dialog box 504 is part of the screen focus when the user selects the dialog box 504 to make the dialog box 504 active to receive input.

The keyboard 506 can a virtual keyboard displayed on the screen 500. Alternatively, the keyboard 506 can be a physical keyboard that is a separate component of the mobile device. The display also includes a display of an input button 505. The user can select the input button 505 after the password has been entered into the dialog box 504. The user can select the input button 505 by touching the screen 500 at the location of the input button 505. Alternatively, the user can select the input button 505 by using the keyboard 506 when a screen focus of the screen 500 includes the input button 506.

In some embodiments, the electromagnetic radiation source becomes active to emit electromagnetic radiation if the location of the mobile device is public and if confidential data is displayed on the screen of the mobile device. To illustrate, assume that a location of the mobile device including the screen 500 of FIG. 5 is public. If the user's banking account number 502 is considered confidential data, its display on the screen 500 would activate the electromagnetic radiation source. Activation of the electromagnetic radiation source in this example can continue until the confidential data is no longer displayed on the screen 500.

The electromagnetic radiation source can also become active to emit electromagnetic radiation if the location of the mobile device is public and if any type of interface is displayed on a screen of the mobile device to receive confidential data from the user. To illustrate, again assume that a location of the mobile device including the screen 500 of FIG. 5 is public. Because the display on the screen 500 includes a dialog box 504 to receive confidential data, the electromagnetic radiation source would be activated. In this example, activation of the electromagnetic radiation source occurs regardless of whether the dialog box 504 is active as part of the screen focus of the screen 500. Activation of the electromagnetic radiation source in this example can continue until the display does not include the dialog box 504 on the screen 500.

The electromagnetic radiation source can also become active to emit electromagnetic radiation if the location of the mobile device is public and if a screen focus of the screen includes a dialog box that is active such that the user can input their confidential data. To illustrate, again assume that a location of the mobile device including the screen 500 of FIG. 5 is public. Also assume that the screen focus of the screen 500 includes the dialog box 504. Because the screen focus includes the dialog box 504 that is active such that the user can input their confidential data therein, the electromagnetic radiation source would be activated. Activation of the electromagnetic radiation source in this example can continue until the dialog box 504 is no longer part of the screen focus. Therefore, in this example, the electromagnetic radiation source can be deactivated if the screen focus does not include the dialog box 504 (even though the dialog box 504 is still being displayed).

Example Operations

Figure 6:
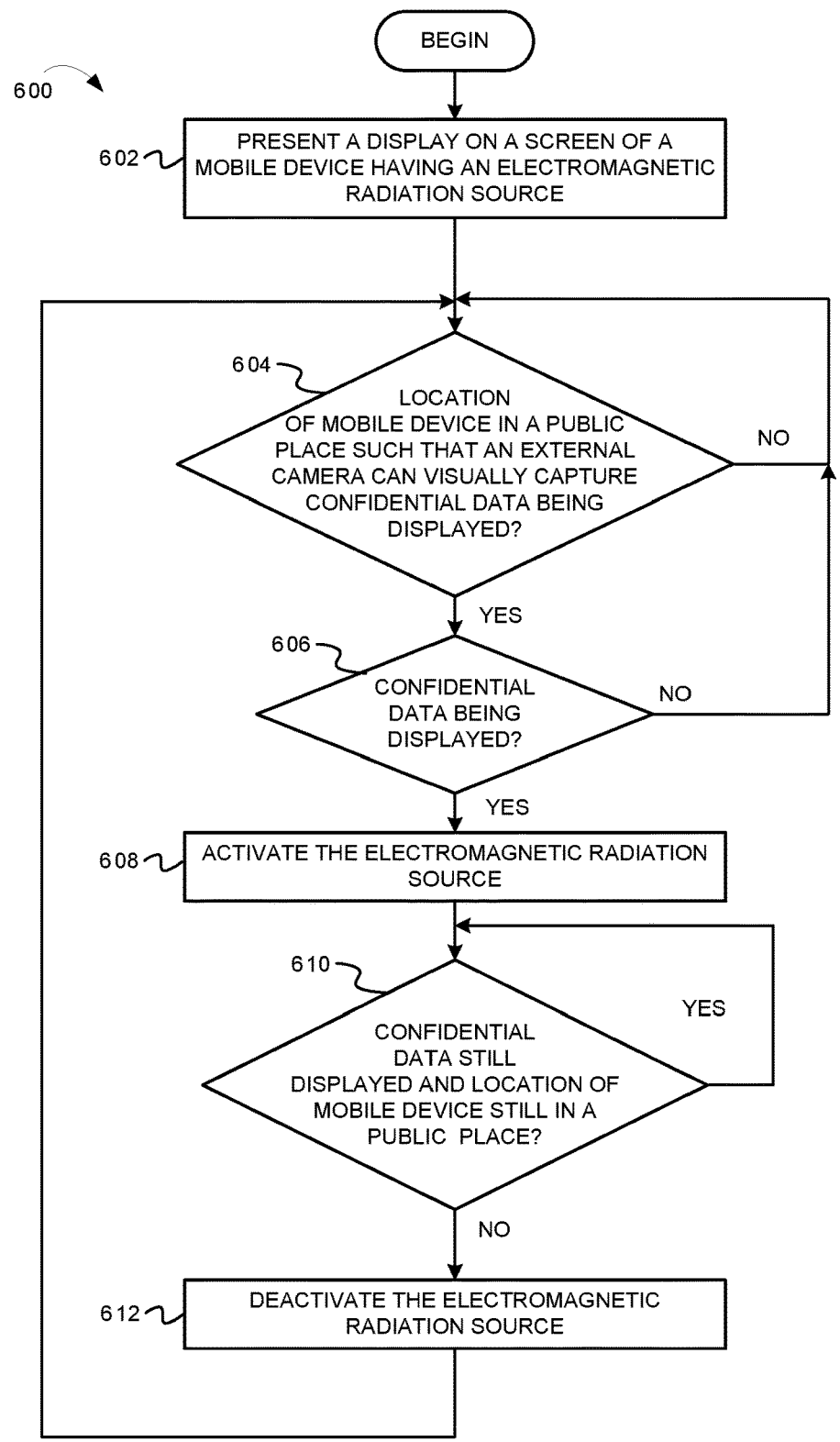
FIG. 6 depicts a flowchart of operations for protection of confidential data being displayed on a mobile device, according to some embodiments.
Figure 7:
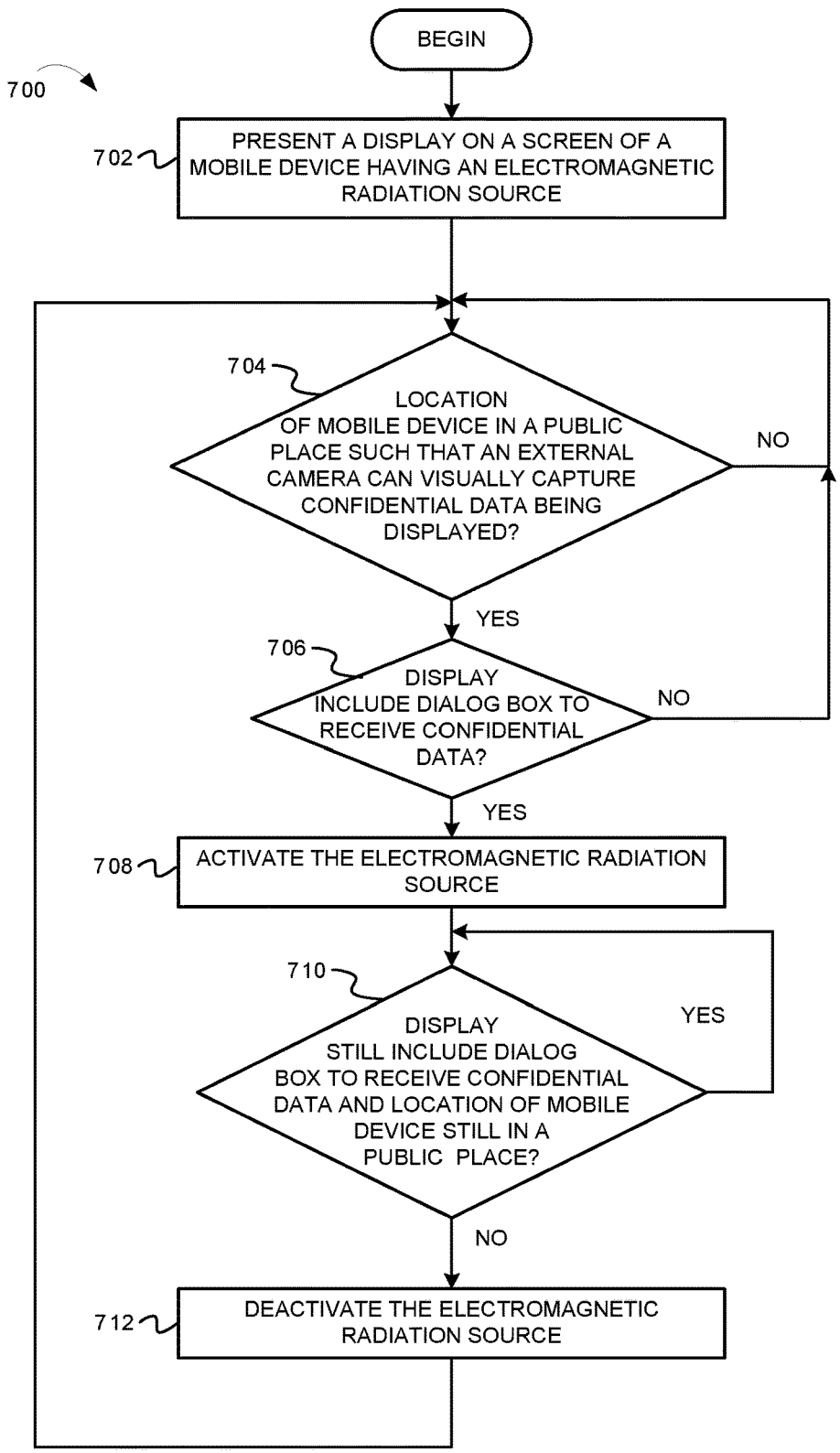
FIG. 7 depicts a flowchart for protection of confidential data to be input on an interface being displayed on a mobile device regardless of screen focus, according to some embodiments.
Figure 8:
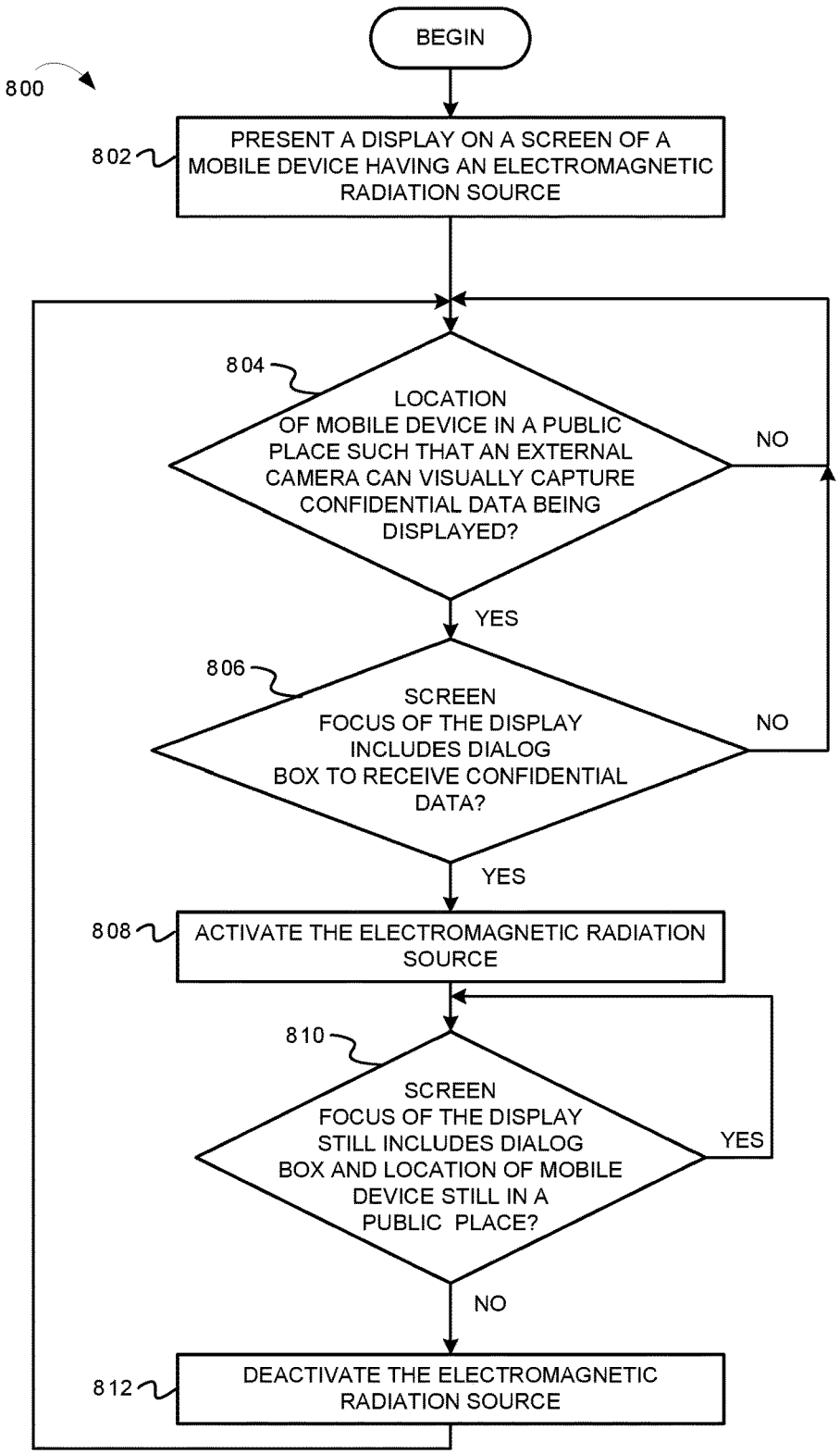
FIG. 8 depicts a flowchart for protection of confidential data to be input on an interface being displayed on a mobile device when a screen focus includes an interface element to receive the confidential data, according to some embodiments.

To further illustrate operations of the example application environment of FIGS. 1-3, FIGS. 6-8 depict flowcharts for protection of confidential data being displayed or input by a user into their mobile device, according to some embodiments. FIG. 6 depicts a flowchart of operations for protection of confidential data being displayed on a mobile device, according to some embodiments. FIGS. 7-8 depict flowcharts for protection of confidential data to be input on an interface being displayed on a mobile device. In particular, FIG. 7 depicts a flowchart for protection of confidential data to be input on an interface being displayed on a mobile device regardless of screen focus, according to some embodiments. Whereas, FIG. 8 depicts a flowchart for protection of confidential data to be input on an interface being displayed on a mobile device when a screen focus includes an interface element to receive the confidential data, according to some embodiments. Operations depicted by the flowcharts in FIGS. 6-8 can be performed by software, firmware, hardware or a combination thereof (see for example one of the mobile applications 423-425 and/or the operating system 421 depicted in FIG. 4). FIG. 6 is now described. Operations of the flowchart 600 start at block 602.

A display is presented on a screen of a mobile device having an electromagnetic radiation source (602). With reference to FIGS. 1-3, a mobile application executing on the mobile device 102 can present a display on the screen 106.

A determination is made of whether a location of the mobile device is in a public place such that an external camera can visually capture confidential data being displayed on the screen of the mobile device (604). In some embodiments, the mobile application that is presenting the confidential data can make this determination. The determination can be made based on a GPS location of the mobile device. For example, the mobile application can query a mapping mobile application executing on the mobile device. The mapping mobile application can return the GPS location and whether the GPS location is associated with any point of interest. For example, the mapping mobile application can return the GPS coordinates and that these GPS coordinates are associated with a particular business, government building, an airport, etc. In some embodiments, the mapping mobile application can also return whether these particular GPS coordinates are identified as being in a public place. Alternatively, the mobile application presenting the confidential data can determine whether these GPS coordinates are identified as being in a public place. For example, the mobile application can make this determination by querying a database of GPS coordinates that are identified being in a public place or not. The database can be locally stored on the mobile device or remotely stored on a server that can be wirelessly queried.

Alternatively, the mobile application can make this determination based on the identification of the point of interest. For example, if the point of interest is any type of business, government building, public park, airport, etc., the mobile device would be considered to be in a public place. In some embodiments, the mobile application presenting the confidential data can directly query the GPS module of the mobile device to determines the mobile device's GPS coordinates. The mobile application can make this determination by querying a database of GPS coordinates that are identified being in a public place or not. While described as being performed by the mobile application presenting the confidential data, in some embodiments, the operating system for the mobile device can make this determination.

In some embodiments, the user of the mobile device can also personalize the identification of public places for their mobile device. For example, the user can change a location from being identified as a public place to not being a public place, or vice versa. In one example, the user can set the GPS location of their primary residence. The user can then configure their mobile device such that that any location that does not include their residence is considered a public place. If the location of the mobile device is not in a public place such that an external camera can visually capture confidential data being displayed on the screen of the mobile device, operations of the flowchart 600 remain at 604, where this determination is again made. If the location of the mobile device is in a public place such that an external camera can visually capture confidential data being displayed on the screen of the mobile device, operations of the flowchart 600 continue at 606.

A determination is made of whether confidential data is being displayed on a screen of the mobile device (606). In some embodiments, the mobile application that is presenting the confidential data can make this determination based on the type of data being displayed. For example, display elements on an interface being displayed on the screen 106 can include an attribute that identifies the data to be displayed as confidential or non-confidential. For example, an attribute of a display element to display a user's username, date of birth, social security number, or other type of private information can be confidential. Whereas, an attribute of a display element to display non-private data (e.g., time of day, current date, air temperature, etc.) can be non-confidential. If confidential data is not being displayed on a screen of the mobile device, operations of the flowchart 600 return to 604. If confidential data is being displayed on a screen of the mobile device, operations of the flowchart 600 continue at 608.

The electromagnetic radiation source is activated (608). In some embodiments, the mobile application or the operating system can activate the electromagnetic radiation source. For example, the mobile application or the operating system can transmit a control signal or instruction to the electromagnetic radiation source to activate to emit electromagnetic radiation. Emission of electromagnetic radiation can obscure the confidential data being displayed or input on a screen of the mobile device. In some embodiments, emission of the electromagnetic radiation can be essentially constant. Alternatively, emission of the electromagnetic radiation can be a blinking emission (wherein the electromagnetic radiation source is switched on and off quickly and repeatedly). An example of an electromagnetic radiation source can include a visible light source, such as a Light Emitting Diode (LED) light source. In some embodiments, the electromagnetic radiation source is front facing.

After activation of the electromagnetic radiation source, a determination is made of whether the confidential data is still being displayed and whether a location of the mobile device is still in a public place (610). In some embodiments, the mobile application can make these determinations. For example, the mobile application can determine whether any display element being displayed on the screen 106 is defined as confidential (as described above). The mobile application can query the GPS module or a mobile mapping application to determine whether a location of the mobile device is in a public place (as described above). If the confidential data is still being displayed and a location of the mobile device is still a public place, operations of the flowchart 600 remain at 610. If the confidential data is no longer being displayed or a location of the mobile device is no longer a public place, operations of the flowchart 600 continue at 612.

The electromagnetic radiation source is deactivated (612). In some embodiments, the mobile application or the operating system can deactivate the electromagnetic radiation source. For example, the mobile application or the operating system can transmit a control signal or instruction to the electromagnetic radiation source to deactivate to stop emission of electromagnetic radiation. Operations of the flowchart 600 then return to 604 to whether a location of the mobile device is in a public place such that an external camera can visually capture confidential data being displayed on the screen of the mobile device. Operations of the flowchart 600 can continue as long as the mobile device is powered-on. Alternatively, the user can deactivate this functionality, thereby aborting operations of the flowchart 600.

FIG. 7 is now described. FIG. 7 depicts a flowchart for protection of confidential data to be input on an interface being displayed on a mobile device regardless of screen focus, according to some embodiments. Operations of the flowchart 700 start at block 702.

A display is presented on a screen of a mobile device having an electromagnetic radiation source (702). With reference to FIGS. 1-3, a mobile application executing on the mobile device 102 can present a display on the screen 106.

A determination is made of whether a location of the mobile device is in a public place such that an external camera can visually capture confidential data being displayed on the screen of the mobile device (704). In some embodiments, the mobile application that is presenting the confidential data or the operating system can make this determination. Operations for making this determination can be similar to the operations for making this determination as described above for the flowchart 600 depicted in FIG. 6. If the location of the mobile device is not in a public place such that an external camera can visually capture confidential data being displayed on the screen of the mobile device, operations of the flowchart 700 remain at 704, where this determination is again made. If the location of the mobile device is in a public place such that an external camera can visually capture confidential data being displayed on the screen of the mobile device, operations of the flowchart 700 continue at 706.

A determination is made of whether the display on a screen of the mobile device includes a dialog box to receive confidential data (706). In some embodiments, the mobile application that is presenting the confidential data can make this determination. For example, each dialog box on an interface for receiving user input can have an attribute that defines whether the input to be received is confidential or non-confidential. For example, an attribute of a dialog box to receive a user's password, a user's username, date of birth, social security number, or other type of private information can be confidential. Whereas, an attribute of a dialog box to receive non-private data (e.g., user's first and last name, current city and state of user's residence, etc.) can be non-confidential. If the display on a screen of the mobile device includes a dialog box to not receive confidential data, operations of the flowchart 700 return to 704. If the display on a screen of the mobile device includes a dialog box to receive confidential data, operations of the flowchart 700 continue at 708.

The electromagnetic radiation source is activated (708). In some embodiments, the mobile application or the operating system can activate the electromagnetic radiation source. For example, the mobile application or the operating system can transmit a control signal or instruction to the electromagnetic radiation source to activate to emit electromagnetic radiation. Operations for activation of the electromagnetic radiation source can be similar to the operations for performing these operations as described above for the flowchart 600 depicted in FIG. 6.

After activation of the electromagnetic radiation source, a determination is made of whether the display on a screen of the mobile device includes a dialog box to receive confidential data and whether a location of the mobile device is still in a public place (710). As described above, the mobile application can make these determinations. If the display on a screen of the mobile device includes a dialog box to receive confidential data and a location of the mobile device is still a public place, operations of the flowchart 700 remain at 710. If the display on a screen of the mobile device does not include a dialog box to receive confidential data or a location of the mobile device is no longer a public place, operations of the flowchart 700 continue at 712.

The electromagnetic radiation source is deactivated (712). In some embodiments, the mobile application or the operating system can deactivate the electromagnetic radiation source. For example, the mobile application or the operating system can transmit a control signal or instruction to the electromagnetic radiation source to deactivate to stop emission of electromagnetic radiation. Operations of the flowchart 700 then return to 704 to whether a location of the mobile device is in a public place such that an external camera can visually capture confidential data being displayed on the screen of the mobile device. Operations of the flowchart 700 can continue as long as the mobile device is powered-on. Alternatively, the user can deactivate this functionality, thereby aborting operations of the flowchart 700.

FIG. 8 is now described. FIG. 8 depicts a flowchart for protection of confidential data to be input on an interface being displayed on a mobile device when a screen focus includes an interface element to receive the confidential data, according to some embodiments. Operations of the flowchart 800 start at block 802.

A display is presented on a screen of a mobile device having an electromagnetic radiation source (802). With reference to FIGS. 1-3, a mobile application executing on the mobile device 102 can present a display on the screen 106.

A determination is made of whether a location of the mobile device is in a public place such that an external camera can visually capture confidential data being displayed on the screen of the mobile device (804). In some embodiments, the mobile application that is presenting the confidential data or the operating system can make this determination. Operations for making this determination can be similar to the operations for making this determination as described above for the flowchart 600 depicted in FIG. 6. If the location of the mobile device is not in a public place such that an external camera can visually capture confidential data being displayed on the screen of the mobile device, operations of the flowchart 800 remain at 804, where this determination is again made. If the location of the mobile device is in a public place such that an external camera can visually capture confidential data being displayed on the screen of the mobile device, operations of the flowchart 800 continue at 806.

A determination is made of whether the screen focus of the display on a screen of the mobile device includes a dialog box to receive confidential data (806). In some embodiments, the mobile application that is presenting the confidential data can make this determination. As described above, a screen focus of a display is that part of the display that is active to receive input from a user of the mobile device. Thus, the mobile application can determine whether a dialog box that is configured to receive confidential data is in the screen focus of the display. As described above, each dialog box can be assigned an attribute that defines the data to be input into the dialog box as confidential or non-confidential. In some embodiments (instead of the mobile application), the operating system can provide an option to indicate that a dialog box is confidential or non-confidential. In response to the screen focus changing to include a dialog box that is defined as confidential, the operating system can activate the electromagnetic radiation source (described below). If the screen focus of the display on a screen of the mobile device does not include a dialog box to receive confidential data, operations of the flowchart 800 return to 804. If the screen focus of the display on a screen of the mobile device does include a dialog box to receive confidential data, operations of the flowchart 800 continue at 808.

The electromagnetic radiation source is activated (808). In some embodiments, the mobile application or the operating system can activate the electromagnetic radiation source. For example, the mobile application or the operating system can transmit a control signal or instruction to the electromagnetic radiation source to activate to emit electromagnetic radiation. Operations for activation of the electromagnetic radiation source can be similar to the operations for performing these operations as described above for the flowchart 800 depicted in FIG. 8.

After activation of the electromagnetic radiation source, a determination is made of whether the screen focus of the display on a screen of the mobile device still includes a dialog box to receive confidential data and whether a location of the mobile device is still in a public place (810). As described above, the mobile application and/or the operating system can make these determinations. If the screen focus of the display on a screen of the mobile device still includes a dialog box to receive confidential data and a location of the mobile device is still a public place, operations of the flowchart 700 remain at 810. If the screen focus of the display on a screen of the mobile device does not include a dialog box to receive confidential data or a location of the mobile device is no longer a public place, operations of the flowchart 800 continue at 812.

The electromagnetic radiation source is deactivated (812). In some embodiments, the mobile application or the operating system can deactivate the electromagnetic radiation source. For example, the mobile application or the operating system can transmit a control signal or instruction to the electromagnetic radiation source to deactivate to stop emission of electromagnetic radiation. Operations of the flowchart 800 then return to 804 to whether a location of the mobile device is in a public place such that an external camera can visually capture confidential data being displayed on the screen of the mobile device. Operations of the flowchart 800 can continue as long as the mobile device is powered-on. Alternatively, the user can deactivate this functionality, thereby aborting operations of the flowchart 800.

While described in separate flowcharts, operations depicted in FIGS. 6-8 can be practiced together in different combinations. For example, operations from all of FIGS. 6-8 can be combined. In this example, if confidential data is displayed or if the display includes a dialog box to receive confidential data or if a screen focus includes the dialog box to receive the confidential data, the electromagnetic radiation source can be activated. In another example, operations from FIGS. 6-7 can be combined. In this example, if confidential data is displayed or if the display includes a dialog box to receive confidential data, the electromagnetic radiation source can be activated. In another example, operations from FIGS. 6 and 8 can be combined. In this example, if confidential data is displayed or if a screen focus includes the dialog box to receive the confidential data, the electromagnetic radiation source can be activated. In another example, operations from FIGS. 7-8 can be combined. In this example, if the display includes a dialog box to receive confidential data or if a screen focus includes the dialog box to receive the confidential data, the electromagnetic radiation source can be activated.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for cache priming as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. One or more non-transitory machine-readable media having program code stored therein, the program code comprising instructions to:
   present a display on a screen of a mobile device having a light source, wherein the display includes an input field to receive confidential data;
   determine whether a location of the mobile device is such that an external imaging device can visually capture the confidential data being input into the input field;
   based on a determination that the location of the mobile device is such that the external imaging device can visually capture the confidential data, determine whether a screen focus of the display includes the input field;
   in response to the screen focus of the display including the input field, activate the light source; and
   deactivate the light source after submission of the confidential data in the input field is complete.

2. The one or more non-transitory machine-readable media of claim 1, wherein the instructions to activate the light source comprise instructions to activate a front-facing electromagnetic radiation source on the mobile device.

3. The one or more non-transitory machine-readable media of claim 1, wherein the instructions to activate the light source comprise instructions to vary an intensity of light being emitted from the light source based, at least in part, on an amount of ambient light around the mobile device.

4. The one or more non-transitory machine-readable media of claim 1, wherein the instructions to activate the light source comprise the instructions to cause the light source to emit a blinking light emission.

5. The one or more non-transitory machine-readable media of claim 1, wherein the instructions to determine whether the location of the mobile device is such that an external imaging device can visually capture the confidential data being input into the input field comprise instructions to determine the location of the mobile device and then determine whether the location is a public place.

6. The one or more non-transitory machine-readable media of claim 5, wherein the instructions to determine whether the location is a public place comprise instructions to determine whether the location is indicated in the mobile device as a private place.

7. The one or more non-transitory machine-readable media of claim 5, wherein the instructions to determine whether the location is a public place comprise instructions to access a mapping application to determine whether global positioning coordinates of the mobile device match a place of interest indicated as a public place.

8. A mobile device comprising:
   a processor;
   a screen;
   a light source; and
   a machine-readable medium having stored therein instructions executable by the processor to cause the mobile device to,
   present on the screen a display that includes an input field to receive confidential data;
   determine whether the mobile device is at a location susceptible to an external imaging device visually capturing confidential data input into the input field;
   based on a determination that the mobile device is at a location susceptible to an external imaging device visually capturing confidential data input into the input field, determine whether a screen focus of the display includes the input field;

based on the screen focus of the display including the input field, activate the light source; and deactivate the light source after submission of the confidential data in the input field is complete.

9. The mobile device of claim 8, wherein the instructions to activate the light source comprise instructions executable by the processor to cause the mobile device to activate a front-facing electromagnetic radiation source on the mobile device.

10. The mobile device of claim 8, wherein the instructions to activate the light source comprise instructions executable by the processor to cause the mobile device to vary an intensity of light being emitted from the light source based, at least in part, on an amount of ambient light around the mobile device.

11. The mobile device of claim 8, wherein the instructions to activate the light source comprise the instructions being executable by the processor to cause the mobile device to cause the light source to emit a blinking light emission.

12. The mobile device of claim 8, wherein the instructions to determine whether the mobile device is at a location susceptible to an external imaging device visually capturing confidential data input into the input field comprise instructions executable by the processor to cause the mobile device to determine the location of the mobile device and then determine whether the location is a public place.

13. The mobile device of claim 12, wherein the instructions to determine whether the mobile device is at a location susceptible to an external imaging device visually capturing confidential data input into the input field comprise instructions executable by the processor to cause the mobile device to determine whether the location is indicated in the mobile device as a private place.

14. The mobile device of claim 12, wherein the instructions to determine whether the location is a public place comprise instructions executable by the processor to cause the mobile device to access a mapping application to determine whether global positioning coordinates of the mobile device match a place of interest indicated as a public place.

15. A method comprising:
presenting on a screen of a mobile device a display that includes an input field to receive confidential data;

determining whether the mobile device is at a location susceptible to an external imaging device visually capturing confidential data input into the input field;

based on a determination that the mobile device is at a location susceptible to an external imaging device visually capturing confidential data input into the input field, determining whether a screen focus of the display includes the input field;

based on the screen focus of the display including the input field, activating the light source; and deactivating the light source after submission of the confidential data in the input field is complete.

16. The method of claim 15, wherein activating the light source comprises causing the mobile device to activate a front-facing electromagnetic radiation source on the mobile device.

17. The method of claim 15, wherein activating the light source comprises causing the mobile device to vary an intensity of light being emitted from the light source based, at least in part, on an amount of ambient light around the mobile device.

18. The method of claim 15, wherein activating the light source comprises causing the light source to emit a blinking light.

19. The method of claim 15, wherein determining whether the mobile device is at a location susceptible to an external imaging device visually capturing confidential data input into the input field comprises determining the location of the mobile device and then determining whether the location is a public place.

20. The method of claim 19, wherein determining whether the mobile device is at a location susceptible to an external imaging device visually capturing confidential data input into the input field comprises determining whether the location is indicated in the mobile device as a private place.

* * * * *